United States Patent [19]

Metzger et al.

[11] Patent Number: 4,579,918

[45] Date of Patent: Apr. 1, 1986

[54] PREPARATION OF COPOLYMERS OF ETHYLENE WITH CARBOXYL-CONTAINING COMONOMERS IN A 2-ZONE REACTOR UNDER MORE THAN 500 BAR

[75] Inventors: Werner Metzger, Hessheim; Franz Brandstetter, Neustadt; Klaus Boettcher; Klaus Pfleger, both of Wesseling, all of Fed. Rep. of Germany

[73] Assignee: BASF Aktiengesellschaft, Fed. Rep. of Germany

[21] Appl. No.: 699,193

[22] Filed: Feb. 7, 1985

[30] Foreign Application Priority Data

Feb. 10, 1984 [DE] Fed. Rep. of Germany ....... 3404742

[51] Int. Cl.$^4$ .................. C08F 220/02; C08F 220/04; C08F 2/00
[52] U.S. Cl. ........................................ 526/64; 526/75; 526/79; 526/87; 526/318.45; 526/318.6
[58] Field of Search ...................... 526/318.25, 318.45, 526/64, 66, 318.6, 75, 87, 79

[56] References Cited

U.S. PATENT DOCUMENTS

| 2,951,061 | 8/1960 | Gomory | 526/64 |
| 3,132,120 | 5/1964 | Graham et al. | 260/78.5 |
| 3,520,861 | 7/1970 | Thomson et al. | 260/88.1 |
| 3,546,189 | 12/1970 | Rätzsch | 526/64 |
| 3,658,741 | 4/1972 | Knutson | 526/318.6 |
| 3,725,378 | 4/1973 | Chamberlin | 260/94.9 |
| 4,248,990 | 2/1981 | Pieski | 526/318.25 |
| 4,252,924 | 2/1981 | Chatterjee | 526/318.6 |
| 4,351,931 | 9/1982 | Armitage | 526/227 |

FOREIGN PATENT DOCUMENTS

| 1952693 | 6/1970 | Fed. Rep. of Germany | 3/4 |
| 1196185 | 6/1970 | United Kingdom . | |
| 1298732 | 12/1972 | United Kingdom | 15/40 |
| 1468228 | 3/1977 | United Kingdom | 210/2 |

Primary Examiner—C. Warren Ivy
Attorney, Agent, or Firm—Keil & Weinkauf

[57] ABSTRACT

Copolymers of ethylene containing not more than 4 moles, based on 100 moles of ethylene, of copolymerized $C_3$–$C_6$-alkenecarboxylic acids are prepared in a continuously operated tubular polymerization system under high pressures and temperatures in the presence of a polymerization initiator by a process in which a mixture of ethylene, the alkenecarboxylic acid, if required a further monomer which is copolymerizable with ethylene, an initiator and, if required, a regulator is fed into the polymerization system at its entrance and at the same time at a second point downstream of the entrance, along the polymerization system, where the reaction temperature has exceeded a maximum, the amount of alkenecarboxylic acid at the entrance of the polymerization system being not more than 0.3, preferably less than 0.28, mole, based on 100 moles of ethylene, and the remainder being metered in at the second feed point.

3 Claims, No Drawings

PREPARATION OF COPOLYMERS OF ETHYLENE WITH CARBOXYL-CONTAINING COMONOMERS IN A 2-ZONE REACTOR UNDER MORE THAN 500 BAR

The present invention relates to a process for the preparation of copolymers of ethylene, containing not more than 4 moles, based on 100 moles of ethylene, of copolymerized $C_3$–$C_6$-alkenecarboxylic acids, in a continuously operated tubular polymerization system under from 500 to 5,000 bar and at from 50° to 450° C. in the presence of a free radical polymerization initiator, in which a mixture of ethylene, the alkenecarboxylic acid, if required a further monomer which is copolymerizable with ethylene, an initiator and, if required, a regulator is fed into the polymerization system at its entrance and at the same time at a second point downstream of the entrance, along the polymerization system, where the reaction temperature has exceeded a maximum.

In the high-pressure polymerization of ethylene, it is known that the ethylene stream can be divided into a plurality of bleed streams, after which one of these bleed streams can be heated to the initiation temperature and then passed into the beginning of a tubular reactor. In this conventional process, the other bleed stream or streams are then fed in cold at several points of the reactor which lie one behind the other in the direction of flow of the polymerizing ethylene. The cold ethylene is passed in at, or slightly downstream of, those points of the reactor where the polymerization mixture in the reactor has exceeded the maximum permissible polymerization temperature. The temperature of the ethylene which is passed in cold and which also contains an initiator is such that the temperature after mixing has taken place in the reactor does not fall below the initiation temperature of the ethylene polymerization, which depends on the catalyst used. In this manner, it is possible to increase the conversion of ethylene to polyethylene per throughput. In this conventional process, for example, atmospheric oxygen is added to the ethylene before or after compression, as a polymerization initiator. Instead of atmospheric oxygen, it is also possible to feed in peroxides or hydroperoxides or a mixture of peroxide compounds (cf. U.S. Pat. No. 3,725,378).

It has also been disclosed that copolymers of ethylene with carboxyl-containing comonomers can be prepared in an autoclave (cf. U.S. Pat. No. 3,520,861 and U.S. Pat. No. 4,351,931).

Terpolymers of ethylene with carboxyl-containing monomers and with another monomer which is copolymerizable with ethylene are also described in, for example, British Pat. Nos. 1,298,732, 1,196,185 and 1,468,228. DE-A No. 1 952 693 mentions the possibility of preparing ethylene copolymers with carboxyl-containing comonomers or with other comonomers in a single-zone reactor.

The disadvantage of all conventional processes, both those carried out in an autoclave and those effected in a single-zone reactor, is the unsatisfactory conversion of the comonomer.

While the above processes involve direct polymerization of the ethylene with carboxyl-containing comonomers, it is also possible to obtain carboxyl-containing copolymers of ethylene by thermal cleavage or by hydrolysis of ethylene copolymers with acrylates, as described in, for example, U.S. Pat. No. 3,132,120. In the process which employs thermal cleavage of acrylates, and in which in particular thermally unstable acrylates, such as tert.-butyl acrylate, are employed, the thermal instability of the monomer imposes a very severe restriction on the temperature program in the reaction system. This reduces the flexibility of the process and also results in low conversions. If hydrolysis of the acrylate is carried out, a further process step is necessary, which in turn leads to higher costs.

It is an object of the present invention to provide an improved process which makes it possible to copolymerize ethylene with carboxyl-containing comonomers with high conversions in a tubular polymerization system.

We have found that this object is achieved, in accordance with the invention, if, in the process described at the outset, the amount of alkenecarboxylic acid at the entrance of the polymerization system is not more than 0.3 mole, based on 100 moles of ethylene, and the remainder is metered in at the second feed point.

In preferred processes, more than 50 mole % of the alkenecarboxylic acid is metered in at the second feed point. Another preferred process is one in which less than 0.28 mole of alkenecarboxylic acid per 100 moles of ethylene is metered in at the entrance.

For the purposes of the present invention, copolymers of ethylene with $C_3$–$C_6$-alkenecarboxylic acids are those ethylene copolymers which can be prepared under the stated temperature and pressure conditions. Preferably, the temperature is from 150° to 350° C. and the pressure from 150 to 3,000 bar. The term copolymers of ethylene with $C_3$–$C_6$-alkenecarboxylic acids embraces copolymers which contain from 0.1 to 4, preferably from 1.0 to 2.5, moles, based on 100 moles of ethylene, of carboxyl-containing comonomers as copolymerized units. If a further comonomer which is copolymerizable with ethylene is used in addition, the content of additionally copolymerized comonomers is less than 7, preferably from 1 to 4, moles, based on 100 moles of ethylene. Suitable $C_3$–$C_6$-alkenecarboxylic acids are, in particular, acrylic acid, methacrylic acid, itaconic acid, aconitic acid, maleic acid and citraconic acid, acrylic acid and methacrylic acid being particularly useful.

Other suitable comonomers are all those monomers which can be copolymerized with ethylene, in particular those which are monoethylenically unsaturated. Examples of suitable comonomers are esters of (meth)acrylic acid with alcohols of 1 to 8 carbon atoms, vinylcarboxylates, in particular vinyl esters of $C_1$–$C_6$-alkanecarboxylic acids, esters of ethylenically unsaturated dicarboxylic acids, in particular monoesters or diesters of maleic acid and of fumaric acid, amides of monoethylenically unsaturated carboxylic acids, in particular acrylamide and methacrylamide, and N-monoalkylamides and N-dialkylamides of acrylic and methacrylic acid, monoethylenically unsaturated ketones and carbon monoxide. Esters of (meth)acrylic acid with alcohols of 1 to 8 carbon atoms are particularly preferred, methyl, ethyl and n-butylacrylate being very particularly preferred.

The ethylene is copolymerized with the $C_3$–$C_6$-alkenecarboxylic acids, and where relevant with the other comonomers which are copolymerizable with ethylene, in the presence of a free radical initiator. For the purposes of the present invention, free radical polymerization initiators are those catalysts which are also used for the homopolymerization of ethylene under high pressure. Examples of suitable initiators are oxygen, advantageously in amounts of from 2 to 100 mole ppm, based on the ethylene being polymerized. Further suitable initiators are peroxides and other free radical formers, as well as mixtures of peroxides having different decomposition points and hydroperoxides, and mixtures of oxygen and peroxides and/or hydroperoxides.

Examples of peroxides and hydroperoxides are tert.-butyl peroxypivalate, di-tert.-butyl peroxide, tert.-butyl hydroperoxide, tert.-butyl perbenzoate and dilauroyl peroxide. Other free radical polymerization initiators are compounds such as azoisobutyronitrile. It is also possible to use mixtures of oxygen with one or more peroxides.

In general, the reaction is carried out in the presence of a polymerization regulator, which makes it possible to adjust the melt flow index of the resulting copolymers. Examples of suitable regulators are hydrogen, ketones, alcohols, ethers and straight-chain and branched hydrocarbons. Propylene, butene or propionaldehyde is preferably used.

The copolymerization is generally carried out in the absence of a solvent. The small amounts of an inert solvent, in which the polymerization initiator is dissolved can be neglected compared with the other starting materials. If oxygen alone is used as the polymerization initiator, a solvent can be dispensed with.

The process can be carried out using the conventionally operated tubular high-pressure polymerization systems (tube reactors). Tube reactors are tubular polymerization vessels in which the length:diameter ratio of the pressure-resistant tubes is from 10,000:1 to 60,000:1. Ethylene high-pressure polymerization processes in which tube reactors are used are described in, for example, Ullmann's Enzyclopädie der technischen Chemie (1980), 4th edition, vol. 19, pages 167–178, Verlag Chemie GmbH, D-6940 Weinheim.

In the novel process, the gaseous mixture of ethylene, $C_1$–$C_3$-alkenecarboxylic acid, if required a further monomer which is copolymerizable with ethylene, an initiator and, if required, a regulator is fed into the reactor at the entrance and at the same time at a second point downstream of the entrance, along the tube reactor, in the direction of flow of the polymerizing ethylene, where the reaction temperature has exceeded a maximum, this procedure being in accordance with the process of U.S. Pat. Nos. 3,725,378 and 4,076,919 which are cited above. The entrance is in general the beginning of the tubular reactor. The main stream is passed in at the beginning of the reactor, and the sidestream is fed into the reactor in a conventional manner in the region of the second point, at which the temperature reaches a maximum. As a result of this measure, the reaction procedure of the conventional two-zone reactor is obtained.

In the process improved according to the invention, a mixture of ethylene, alkenecarboxylic acid, if required a further monomer which is copolymerizable with ethylene, an initiator and, if required, a regulator is passed in at the entrance and at a second feed point along the reactor, the amount of carboxyl-containing monomer at the entrance of the reactor being not more than 0.3, preferably less than 0.28, mole per 100 moles of ethylene. The remainder of the $C_3$–$C_6$-alkenecarboxylic acid is then metered in at the second feed point along the reactor. Another preferred process is one in which more than 50 mole % of the alkenecarboxylic acid is metered into the reactor at the second feed point. In the process improved according to the invention, it is also possible for a further monomer which is copolymerizable with ethylene to be present. In a particularly preferred process, for example, a mixture of ethylene with from 0.1 to 0.25 mole of acrylic acid and from 0.1 to 0.3 mole of n-butyl acrylate, the amounts being based on 100 moles of ethylene, is fed into the reactor at the entrance, and from 0.4 to 0.8 mole of acrylic acid and from 0.55 to 0.8 mole of n-butyl acrylate is passed into the reactor at the second feed point.

When the alkenecarboxylic acids are metered, according to the invention, into the first and second zones of the two-zone reactor, the resulting copolymers of ethylene with carboxyl-containing comonomers possess good properties and are obtained with high conversions.

EXAMPLES

The copolymerization of ethylene with the comonomers was carried out in each case in a tubular reactor. The ethylene, in two separate gas streams having a ratio of 1:1, was mixed with the particular amount of oxygen stated and the required amount of regulator, and compressed to the reaction pressure. In each case, one of the gas streams was fed to the entrance of the reactor, and the other was passed into the reactor at a second feed point, about one third of the way along the total reactor length, after the reaction in the first reactor section had reached a maximum temperature and the temperature of the mixture had begun to decrease again. As a result of this measure, two reaction zones formed in the tubular reactor (two-zone reactor).

The reactor had a length/diameter ratio of about 10,000 in both reaction zones. To remove some of the heat of reaction, the tube walls were cooled externally with water. In carrying out the experiments stated in the Examples, the amount of comonomers required for the copolymerization was divided between the gas stream for the first reaction zone and that for the second reaction zone.

In carrying out comparative experiment 1, the first reaction zone was used exclusively (single-zone reactor). Comparative experiment 2 was carried out in an autoclave (volume 15 liters; length/diameter ratio 2.5).

The copolymer obtained was separated off from the unreacted monomers in each case in a conventional manner, in the separators downstream of the reactor.

EXAMPLES 1 to 3

A mixture of
Example 1: 982
Example 2: 988
Example 3: 994
parts by weight/hour of ethylene,
Example 1: 6 (0.23 mole/100 moles of ethylene)
Example 2: 5 (0.20 mole/100 moles of ethylene)
Example 3: 6 (0.23 mole/100 moles of ethylene)
parts by weight/hour of acrylic acid and
Example 1: 12
Example 2: 7
Example 3: 0
parts by weight/hour of n-butyl acrylate was compressed to 2,200 bar and fed into the two-zone reactor described above, at its entrance.
Example 1: 21
Example 2: 19
Example 3: 22 mole ppm of oxygen and, in Example 3, also 15 mole ppm of tert.-butyl peroxypivalate were added to the mixture, as an initiator, the amounts in each case being based on ethylene.

A mixture consisting of
Example 1: 955
Example 2: 956
Example 3: 986
parts by weight/hour of ethylene,
Example 1: 14 (0.56 mole/100 moles of ethylene)
Example 2: 19 (0.76 mole/100 moles of ethylene)
Example 3: 14 (0.54 mole/100 moles of ethylene)
parts by weight/hour of acrylic acid and
Example 1: 31
Example 2: 25
Example 3: 0
parts by weight/hour of n-butyl acrylate, and, as an initiator,
Example 1: 16
Example 2: 16
Example 3: 17
mole ppm of oxygen, the amounts being based on ethylene, was fed in at the second feed point.

The pressure at the second feed point was 2,200 bar. As a result of the heat of reaction evolved which was not given up to the cooling agent, the reaction mixture reached 300° C. in the first section of the reactor and 270° C. downstream of the second feed point.

The following molecular weight regulators were employed:
Example 1: propylene
Example 2: propylene
Example 3: propionaldehyde The amount of regulator was such that the resulting melt flow index was 7 g/10 min (Examples 1 and 2) or 3 g/10 min (Example 3), measured according to DIN 53 735 at 190° C. and 2.16 kp.

This procedure gave
Example 1: 427 (corresponding to a conversion of 21.4%)
Example 2: 452 (corresponding to a conversion of 22.6%)
Example 3: 421 (corresponding to a conversion of 21.1%)
parts by weight of ethylene copolymers which contained, as copolymerized units,
Example 1: 1.75
Example 2: 1.91
Example 3: 1.41
moles, based on 100 moles of ethylene, of acrylic acid and
Example 1: 2.39
Example 2: 1.50
Example 3: 0
moles, based on 100 moles of ethylene, of n-butyl acrylate.

COMPARATIVE EXPERIMENTS

COMPARATIVE EXPERIMENT 1

A mixture consisting of 1,987 parts by weight/hour of ethylene, 13 parts by weight/hour of acrylic acid and 58 mole ppm of oxygen, the amounts being based on ethylene, was fed to the single-zone reactor described above. The pressure was 2,200 bar. As a result of the heat of reaction evolved which was not given up to the cooling agent via the reactor wall, the reaction mixture reached 300° C. The molecular weight regulator used was propionaldehyde, and the amount of regulator was such that the resulting melt flow index was 3 g/10 min, measured according to DIN 53 735 at 190° C. and 2.16 kp. The conversion was 16.5%, and the ethylene copolymer contained 1.41 moles, based on 100 moles of ethylene, of acrylic acid.

COMPARATIVE EXPERIMENT 2

Run No. 2 of Example I of U.S. Pat. No. 3,520,861 served as comparative experiment 2. The conversion in this case was 10.3%.

We claim:

1. A process for the preparation of a copolymer of ethylene, containing not more than 4 moles, based on 100 moles of ethylene, of copolymerized $C_3$-$C_6$-alkenecarboxylic acids, in a continuously operated tubular polymerization system under from 500 to 5,000 bar and at from 50° to 450° C. in the presence of a free radical polymerization initiator, in which a mixture of ethylene, the alkenecarboxylic acid, if required a further monomer which is copolymerizable with ethylene, an initiator and, if required, a regulator is fed into the polymerization system at its entrance and at the same time at a second point downstream of the entrance, along the polymerization system, where the reaction temperature has exceeded a maximum, wherein the amount of alkenecarboxylic acid at the entrance of the polymerization system is not more than 0.3 mole, based on 100 moles of ethylene, and the remainder is metered in at the second feed point.

2. A process as claimed in claim 1, wherein more than 50 mol % of the alkenecarboxylic acid is metered into the reactor at the second feed point.

3. A process as claimed in claim 1, wherein less than 0.28 mole of an alkenecarboxylic acid is metered in at the entrance.

* * * * *